No. 655,670. Patented Aug. 7, 1900.
L. E. BROOKES.
MOTOR FRAME ATTACHMENT FOR VEHICLES.
(Application filed Apr. 11, 1898. Renewed Dec. 15, 1899.)
(No Model.)
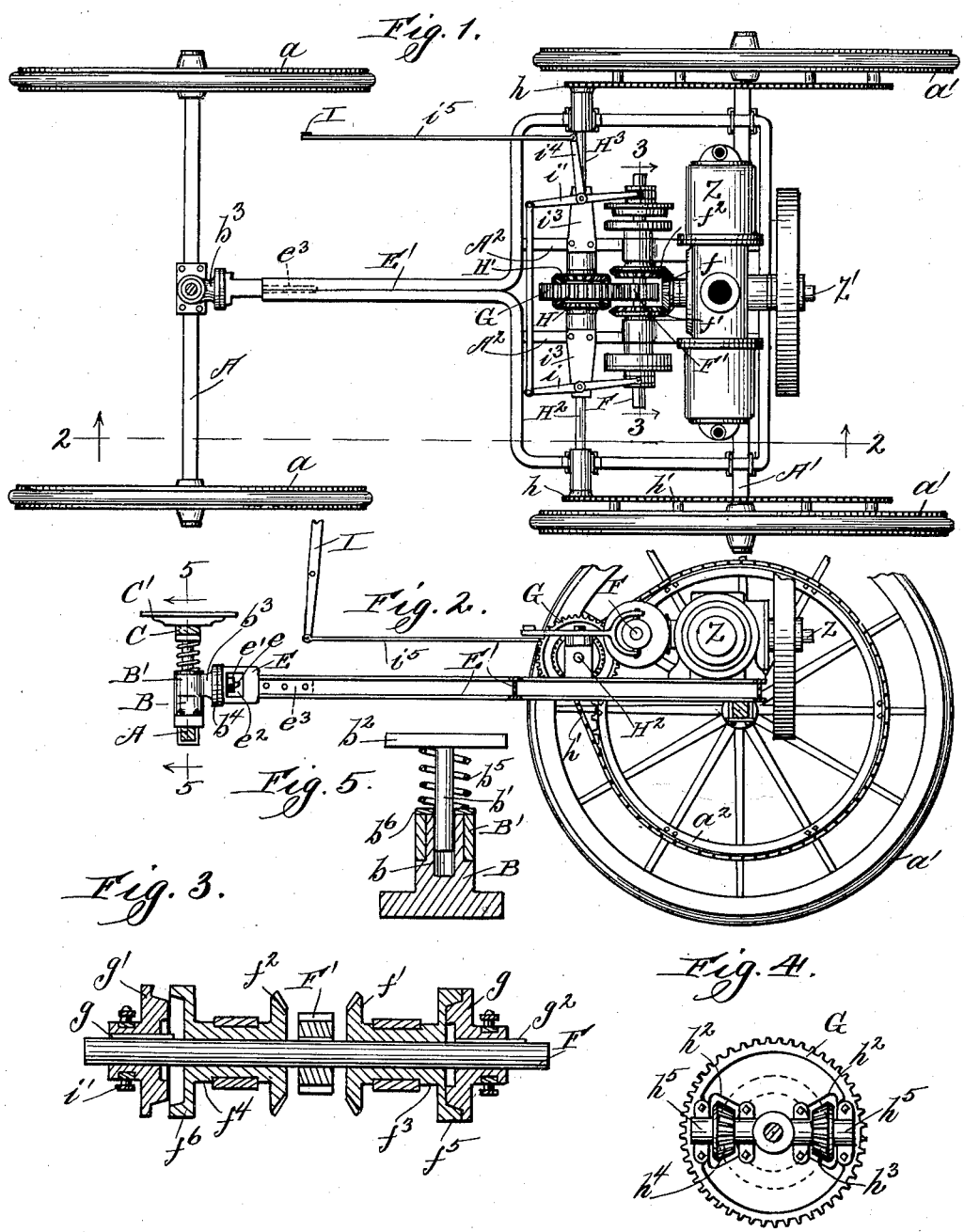
Witnesses:
R. J. Jacker.
E. A. Duggan.
Inventor:
Leonard Elliott Brookes.
By Chas. C. Tillman
Atty.
THE NORRIS PETERS CO., PHOTO-LITHO., WASHINGTON, D. C.

UNITED STATES PATENT OFFICE.

LEONARD ELLIOTT BROOKES, OF CHICAGO, ILLINOIS, ASSIGNOR OF ONE-HALF TO SIDNEY M. WEIR, OF CLEVELAND, OHIO.

MOTOR-FRAME ATTACHMENT FOR VEHICLES.

SPECIFICATION forming part of Letters Patent No. 655,670, dated August 7, 1900.

Application filed April 11, 1898. Renewed December 15, 1899. Serial No. 740,472. (No model.)

*To all whom it may concern:*

Be it known that I, LEONARD ELLIOTT BROOKES, a citizen of the United States, residing at Chicago, in the county of Cook and State of Illinois, have invented certain new and useful Improvements in an Attachable Motor Frame and Mechanism for Carriages, of which the following is a specification.

This invention relates to improvements in a frame to be attached to carriages or vehicles of various kinds, yet it is more especially intended to be used on motor-vehicles and for the purpose of supporting a motor-driven mechanism and equalizing-gear; and it consists in certain peculiarities of the construction, novel arrangement, and operation of the various parts thereof, as will be hereinafter more fully set forth and specifically claimed.

The objects of my invention are, first, to provide a frame which shall be simple and inexpensive in construction, strong and durable, and may be readily attached to a vehicle of the ordinary or any preferred construction, and, second, such a frame which by reason of the peculiar construction and novel arrangement of its parts will permit of the free movement of the forward truck of the vehicle, or, in other words, will afford a swivel connection therefor, thus allowing it to have a vertical as well as a lateral angular movement, the front of the frame acting as a fulcrum-point.

Another object of my invention is to equalize the movement of the wheels of the vehicle when turning corners.

Other objects and advantages will appear in the description hereinafter contained.

In order to enable others skilled in the art to which my invention pertains to make and use the same, I will now proceed to describe it, referring to the accompanying drawings, in which—

Figure 1 is a plan view of a motor-vehicle with my frame attached thereto. Fig. 2 is a sectional view taken on line 2 2 of Fig. 1, looking in the direction indicated by the arrows. Fig. 3 is an enlarged sectional view taken on line 3 3 of Fig. 1, showing the driving-shaft in elevation and illustrating the gears and clutches therefor mounted thereon. Fig. 4 is a view in elevation of the equalizing-gears; and Fig. 5 is a sectional view taken on line 5 5 of Fig. 2, illustrating the manner of connecting the front part of the frame to the forward truck of the vehicle.

Similar letters refer to like parts throughout the different views of the drawings.

A and A' represent, respectively, the forward and rear axles of the carriage, which are provided, as usual, with traction-wheels $a$ and $a'$ of the ordinary or any preferred construction, except that the rear wheels are preferably provided on their adjacent surfaces with sprocket-wheels $a^2$, which may be secured to the spokes, as shown, but in some instances I may employ instead of said sprocket-wheels gears to mesh with pinions on the equalizing-shafts.

Secured to the middle of the front axle A and extending thereabove is a piece B, which is provided with a vertical socket $b$ to receive a pin $b'$, which has at its upper end a plate $b^2$, by means of which it is secured to the lower surface of the bolster C, on which the fifth-wheel C' rests. The upper portion of the socket-piece B is reduced and has fitted therearound a collar B', having a rearward extension $b^3$, provided with a head $b^4$, to which the block or casting E is secured by means of a stud $e$ and nut $e'$. The block or casting E is provided with an opening $e^2$ for the purpose of adjusting the nut on said stud and has an arm $e^3$ extending rearwardly into the front end of the frame E', to which it is secured by means of rivets or otherwise. The frame E is preferably made of metal, usually channel or I shaped in cross-section, and is constructed so that its front portion will be composed of two rails or beams lying parallel and in juxtaposition with one another, while its rear portion comprises a rectangular figure which rests on and is suitably secured to the rear axle A' of the vehicle. Extending from the rear portion of the frame to the front of the rectangular part thereof are brace-beams A², which may also be made of channel or I iron and are for strengthening the frame as well as supporting the motor and other mechanism.

Mounted on the rear part of the frame is a motor Z of the ordinary or any preferred construction, on the front end of the driving-shaft Z' of which is located a beveled gear $f$, which meshes with similar gears $f'$ and $f^2$, loosely mounted on the shaft F, which is journaled in suitable bearings on the braces $A^2$ of the frame. The gears $f'$ and $f^2$ each have a sleeve $f^3$ and $f^4$, respectively, on the outer ends of which are friction-disks $f^5$ and $f^6$, respectively, to engage the friction-clutches $g$ and $g'$, which are rotatably secured on the shaft F by means of keys $g^2$.

Between the gears $f'$ and $f^2$ and keyed to the shaft F is a gear F', which meshes with the gear G, located between the beveled gears H and H', which are mounted on the inner ends of the equalizing-shafts $H^2$ and $H^3$, which shafts are suitably journaled on the frame and have at their outer ends sprocket-wheels $h$ for the sprocket-chains $h'$, which engage the larger sprocket-wheels $a^2$ on the rear traction-wheels. The gear G is provided with openings $h^2$ for the reception and operation of the beveled gears $h^3$ and $h^4$, which are journaled on suitable shafts $h^5$, having their bearings on the gear G, and which gears mesh with the gears H and H', as is clearly shown in Fig. 1 of the drawings.

Pivotally secured to the clutches $g$ and $g'$ are levers $i$ and $i'$, which are united at their outer ends by means of a tie-rod $i^2$ and are fulcrumed on suitable brackets $i^3$, secured to the frame. Extending from the lever $i'$ outwardly is an arm $i^4$, to which is secured a rod $i^5$, which is connected to the lower end of a hand-lever I, suitably fulcrumed and extending upwardly. Around the pin $b'$ and between the plate $b^2$ thereon and the collar B' is a spring $b^5$, whose lower end rests on a washer $b^6$ on said collar.

From the foregoing and by reference to the drawings it will be seen and readily understood that when the driving-shaft Z' of the motor is rotated it will, through the engagement of the gear $f$ with the gears $f'$ and $f^2$, one of which may be rotatably secured with the shaft F by means of one of the clutches, impart motion to the shaft F and through the gears F', G, H, H', $h^3$, and $h^4$ drive the shaft $H^2$ and $H^3$ and through their gearing (which may be sprocket chains and wheels, as shown, or ordinary gears) will drive the wheels of the vehicle. When it is desired to stop or reverse the motion of the carriage, the clutches $g$ and $g'$ may be moved by means of the hand-lever I and its connections with said clutches, so as to cause both of them to be disengaged or one of them to engage one of the friction-disks and the other one to be freed therefrom.

Having thus fully described my invention, what I claim as new, and desire to secure by Letters Patent, is—

1. The combination with the frame, of a socket-piece mounted on the front truck of the vehicle, a collar swiveled on said socket-piece, a swivel connection uniting the collar and the front of the frame, a pin located in said socket and having at its upper end a plate, and a spring located between said plate and the upper end of the socket-piece, substantially as described.

2. The combination with the attachable frame, of a motor transversely mounted on the rear part thereof and having a driving-shaft provided with a beveled gear on its forward end, beveled gears engaging said gear and loosely mounted on a shaft transversely journaled on the frame, a friction-disk secured to each of said gears, friction-clutches mounted on the transverse shaft, levers to move said clutches, a gear mounted on the transverse shaft between the beveled gears thereon, and an equalizing-gear geared to the wheels of the vehicle and engaging the last-named gear, substantially as described.

3. The combination with the attachable frame, of a motor transversely mounted on the rear part thereof and having a driving-shaft provided with a beveled gear on its forward end, beveled gears engaging said gear and loosely mounted on a shaft transversely journaled on the frame, a friction-disk secured to each of said gears, friction-clutches mounted on the transverse shaft, levers to move said clutches, a gear mounted on the transverse shaft between the beveled gears thereon, the shafts $H^2$, and $H^3$, transversely journaled on the frame and geared at their outer ends to the traction-wheels, a beveled gear mounted on the inner end of each of said shafts, a cogged gear journaled between said beveled gears and engaging the gear between the other beveled gears and having openings therein, beveled gears journaled in said openings and engaging the gears on the shafts $H^2$, and $H^3$, substantially as described.

LEONARD ELLIOTT BROOKES.

Witnesses:
 CHAS. C. TILLMAN,
 E. A. DUGGAN.